United States Patent [19]

Wolfert

[11] 4,104,523

[45] Aug. 1, 1978

[54] ELECTRONIC ALPHA PARTICLE COUNTER

[75] Inventor: Ludwig G. Wolfert, Littleton, Colo.

[73] Assignee: Martin Marietta Corporation, Rockville, Md.

[21] Appl. No.: 730,077

[22] Filed: Oct. 6, 1976

[51] Int. Cl.² ............................................. G01T 1/22
[52] U.S. Cl. ................................... 250/370; 250/255; 250/364
[58] Field of Search ............... 250/370, 371, 380, 364, 250/367, 368, 432, 435, 253, 255

[56] References Cited

U.S. PATENT DOCUMENTS

| 3,056,886 | 10/1962 | Glaude et al. | 250/364 |
| 3,558,884 | 1/1971 | Babich et al. | 250/435 X |
| 3,968,371 | 7/1976 | Greendale | 250/255 X |

Primary Examiner—Archie R. Borchelt

[57] ABSTRACT

There is provided an improved radon-222 detector device for counting alpha particles originating from radon-222 gas including an alpha particle permeable window in one end of a body and a surface barrier type semiconductor detector adjacent thereto and spaced from the window, and characterized by a moisture attenuating means adjacent the window and the detector.

21 Claims, 5 Drawing Figures

ELECTRONIC ALPHA PARTICLE COUNTER

BACKGROUND OF THE INVENTION AND PRIOR ART

During the radioactive transformations of uranium, radon-222 is generated. Radon-222 is a radioactive gas with a half-life of 3.825 days and emits alpha particles with energies of 5.0 and 5.5 MeV (Megaelectronvolts). It is a member of the series which begins with uranium and ends with lead-206. Until radon-222 disintegrates, it can migrate in the ground and through ore bodies because of diffusion and other transport phenomena for distances between a few inches to hundreds of feet. Therefore, during uranium exploration alpha particle measurements are an accepted method for measuring concentrations of radon-222 because they occur in the vicinity of uranium ore deposits. Generally, it is sufficient to measure the concentration of the alpha particles to indicate uranium deposits (see U.S. Pat. No. 3,665,194).

Several sensor types such as scintillation counters (U.S. Pat. Nos. 3,415,989 and 3,541,311) gas ionization counters and film or track registration means U.S. Pat. No. (3,655,194) which is sensitive to ionizing radiation can be used. Often, measurements requiring several days have to be performed in many locations. Because of the low cost, film is often used during uranium exploration. Each measurement costs approximately $15.00 at this time. This method has the disadvantage that the measurement results are not available until the film is recovered, developed, and the tracks caused by ionizing radiation are counted and plotted. Such film evaluation is usually performed at a special facility.

In the past, cost and power consumption of electronic particle counters have been prohibitive for so many long term applications. As the availability for inexpensive electronic calculators and electronic wrist watches indicates, small low cost electronic instruments with low power consumption have now become practical when demand for significant number of units is created. The cost of spectroscopic grade semiconductor radiation detectors is currently above $100.00. However, for the proposed instrument as described herein, detectors can be used which do not meet all the requirements of the spectroscopic grade detectors in terms of collection efficiency, current leakage, etc. and, therefore, the cost per detector can be kept to about one-half. The suitability of such detectors for the purposes of this invention, has been determined with a polonium alpha particle source. High voltage biasing, e.g., on the order of 60 volts, is not needed.

Solid-state detectors and especially surface barrier detectors (U.S. Pat. No. 2,670,441) can be degraded or even destroyed because of high humidity. Attempts to seal the detector with a thin (.0003 inch thick) foil are not often successful for long periods because the seals degrade or the very thin foil has pin holes and ambient gas enters the volume of gas surrounding the sensitive detector area. Moreover, condensation of water vapor in the apparatus interferes with alpha particle measurements. These semiconductors are sensitive to light and for accuracy, visible light radiation must be excluded.

The present invention provides means for avoiding problems attendant high humidity and water vapor condensation which is encountered in ground measurements.

Another aspect of the present invention is that instead of using relatively large area semiconductors of high resolution power which under current conditions cost approximately $200.00 each, smaller size, less expensive semiconductors, can be used very effectively for the counting purposes of the present invention. These devices cost considerably less, for example, approximately $40.00 each. In the present embodiments, noise is unimportant and the cost of higher grade semiconductors and associated circuitry can be avoided without sacrifice of satisfactory performance for radon-222 detection purposes.

Still further, it has been found possible to place within the container which is, for example, an aluminum tube 1½ inches diameter by about 11 to 12 inches long, a light emitting diode (LED) numerical display enabling a direct reading of the accumulated count at the location of the device. Alternatively, the impulses resulting in such a display can be transmitted to a remote receiving station by means of a cable containing a suitable number of leads, e.g., 16 leads.

By "shaped desiccant" as used herein is meant a desiccant having a predetermined physical configuration. It may be formed by compacting a body of powdered desiccant under high pressure into a given shape, e.g., a ring shape, or depositing the desiccant on a matrix or support.

BRIEF STATEMENT OF THE INVENTION

Briefly stated, therefore, the present invention is in the provision of an improved radon-222 alpha counter for detection of radon-222 gas concentrations in or near the ground surface. The device of the present invention includes an elongated tubular housing, a semiconductor detector, and circuitry associated with the semiconductor for counting alpha particle impulses originating in the gas sample. To improve the accuracy of the readings and prevent distortion and mechanical destruction of the apparatus, there is provided a means disposed adjacent the detector for abstracting moisture. This may take the form of a shaped desiccant, or a confined body of granular desiccant, e.g., an annulus of compacted material containing silica gel or molecular sieves, or a porous body of granular desiccant such as calcium sulfate through which ambient gas may diffuse or flow.

More specifically, devices in accordance herewith include an alpha particle permeable, visible light impermeable window, preferably recessed in the detection end of the tube and spaced from the semiconductor detector, and an alpha particle permeable gas medium, e.g., air, between the window and the detector. The desiccating means coacts in the gas medium to abstract moisture therefrom.

Preferred embodiments of the present invention are further characterized in that they utilize surface barrier semiconductors, operate on very low voltage, e.g., a voltage source of 4–9 volts and require no circuitry for the imposition of a bias voltage on the semiconductor element. These semiconductors accurately detect radiation energies greater than 0.5 MeV (Megaelectronvolt), e.g., 2–4 MeV.

In situ or remote digital readout of the accumulated count is also provided.

Filter means may be provided for permitting the regulated passage of radon-222 containing gas into the apparatus while excluding water therefrom.

BRIEF DESCRIPTION OF THE DRAWINGS

The present invention may be better understood by having reference to the annexed drawings wherein.

In the description, the same parts are given the same number.

DETAILED DESCRIPTION OF THE DRAWINGS

Figure 1:
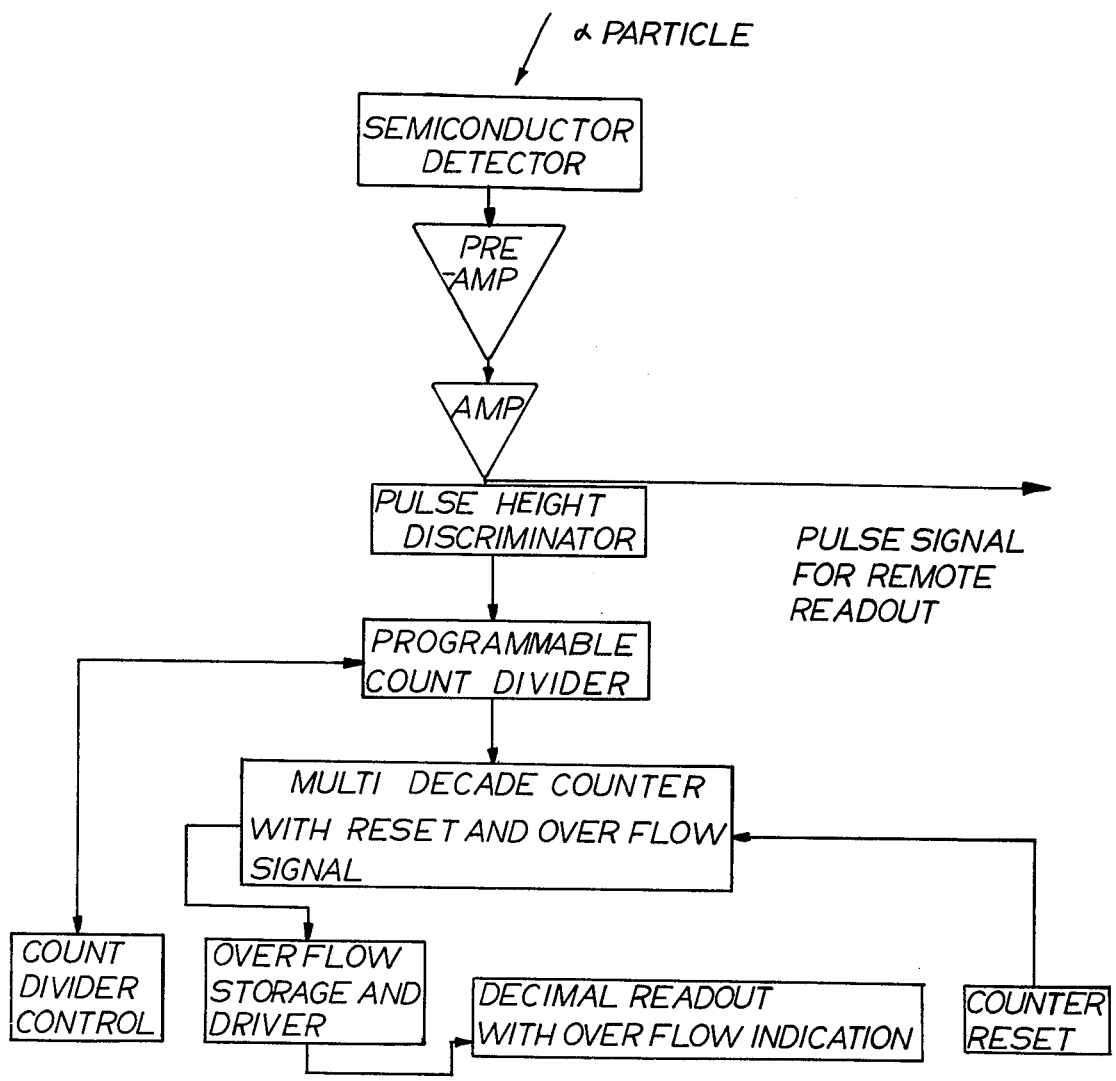
FIG. 1 is a block diagram of known electronic elements for detecting impulses from alpha particles and providing a decimal readout of the number thereof.

FIG. 1 shows a block diagram of the electronic circuitry which can be used in accordance with the present invention. The elements of the alpha particle counter and readout unit of the present invention are all well-known to those skilled in the art as individual components. Although the alpha particle counters of the present invention may be entirely self-contained as indicated in FIG. 1, it should be understood that the readout portion, for example, may be remote from the detector, being connected thereto by means of a suitable cable, e.g., a 16 lead cable or by conducting the shaped count pulses to a remote counter such as a modified low cost electronic calculator. The readout unit is a conventional light emitting diode (LED) unit of the type normally used in commercially available hand-held calculators.

Figure 2:
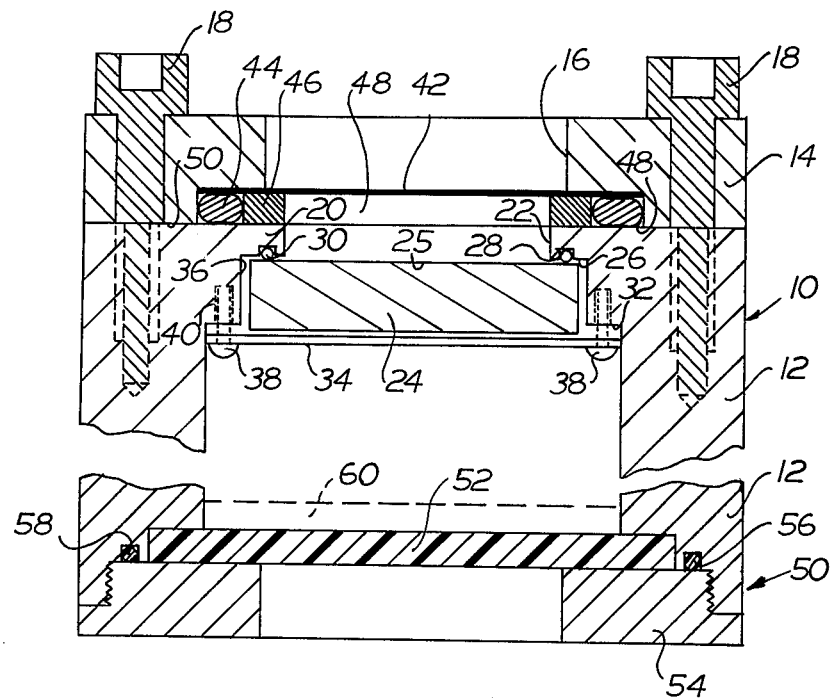
FIG. 2 is a fragmentary cross sectional view of one form of a radon-222 alpha counter in accordance with the present invention.

Referring now more particularly to FIG. 2, there is here shown in fragmentary cross section, an alpha particle counter in accordance herewith. The alpha particle counter generally indicated at 10 comprises a tubular housing 12 preferably formed of aluminum and having a diameter of approximately 1.5 inches, and a length of from 10 to 12 inches. The container is provided with an end cap 14 having an aperture 16 therethrough and secured to the body or housing 12 such as by cap screws 18.

The housing 12 is provided at its detection end with an inwardly directed stepped flange 20 having an aperture 22 extending therethrough.

The flange 20 provides a seat for a detector element 24 which is mounted in the end of the tube 12 by any suitable means. In the embodiment shown in FIG. 2, the detector element 24 is seated against a first shoulder 26 which includes a recess 28 milled therein and having an annular rubber O-ring 30 disposed therein and in sealing engagement with the outer face of the detector 24.

The detectors 24 hereof are of the partially depleted surface barrier type as distinct from the diffused junction type. A smaller area device can be tolerated for surface surveys than normally required for bore hole surveys. Specifically, a gold plated phosphorus/silicon partially depleted surface barrier type semiconductor having a surface area of 100 mm$^2$ and a depletion depth of 3 to 1000$\mu$ is employed. The typical amount of the gold coating is 40 micrograms/cm$^2$.

A second shoulder surface 32 provides an abutment for a cover plate 34, the shoulder 32 being axially displaced from the shoulder 26 to define a recess 36 dimensioned for receipt of the detector 24. The plate 34 is held in position by means of fasteners, e.g., screws 38 extending into threaded bores 40 suitably drilled into the shoulder 32. Thus, the plate 34 clamps the detector 24 between the plate 34 and the shoulder 26, with the gasket or sealing ring 30 interposed therebetween.

The bore 16 is closed by means of an alpha particle permeable membrane 42 which extends across the opening 16. This membrane need not be of as high grade production as previously demanded, for example, in the case of spectroscopic analyzing counters. In the latter, for example, these windows have been formed of a thin, e.g., 0.25 mil thick disc of Mylar (polyethylene terephthalate) which had been coated on one or both sides with a very thin layer of aluminum, e.g., 1 micron thick. In prior devices, any pin holes through the aluminum coating may not be tolerated. In the present case, less perfect aluminum coated Mylar windows may be used thereby saving expense.

An elastomeric, or rubber, O-ring 44 is conveniently utilized for sealing purposes to prevent liquid form water from entering the device through the detection end thereof. Replacement of the window can easily be accomplished in the field. If desired, a wire protective screen may be used to cover the detector end of the device.

As one of the principal features of the present invention, there is provided a shaped desiccant or dryer positioned adjacent, and preferably between the window 42 and the detector 24. In normal embodiments of the present invention, the distance between the window 42 and the outer surface 25 of the detector 24 is about one-eighth of an inch. In the embodiment shown in FIG. 2, the shaped desiccant is an annular ring 46 disposed in an annular recess 48 in the cover plate 14 and defined by the outer surface 50 of the housing 12.

The desiccant is defined herein as being "shaped" to distinguish it from a loose powder or granular situation that can change its shape in response to changes in the position of the detector. The "shaped" desiccant is incapable of undergoing such a change and remains in place. In the embodiment shown in FIG. 2, the shaped desiccant is an annular ring of a solid dryer material, for example compacted silica gel or compacted molecular sieves. Any suitable solid dryer material may be used. The dryer may be supported on another solid shaped matrix, for example, a paper matrix impregnated with anhydrous CaSO$_4$, or a plastic porous matrix having a solid desiccant such as those mentioned before carried in the pores thereof.

The window or membrane 42 is in close proximity to the detector 24. If the space between the window and the detector were evacuated, the spacing of these elements would not be so important. However, in a gaseous environment at 760 Torr., the maximum range of most alpha particles originating from radon-222 is about 1 to 2 inches. To preserve reliability and at the same time avoid the cost of an evacuated chamber, the present devices utilize a gas filled space between the window 42 and the detector, sealed however to water, and spaced well within the 1 to 2 inches limit, e.g., 0.05 to 0.25 inch, e.g., 0.125 inch. The desiccant is in contact with a relatively small volume of gas and able, therefore, to keep it dry over a long period of use.

It has been found that moisture in the cavity 48 between the window 42 and the detector 24 adversely affects the detector life and the readings. The cavity 48 is normally filled with air, the device being desirably liquid water-tight, but not necessarily air-tight for economy in manufacture. These devices are carried to a field in normal field vehicles and, thus, exposed to elevated temperatures. When the devices are inserted into relatively shallow holes in the ground and undergo day-night temperature changes for example, the air in the chamber 48 is cooled and any moisture contained therein may readily deposit on the surface of the window and on the surface of the semiconductor 24. This adversely affects the results, and may cause separation of the electrodes from the body of the semiconductor.

The opposite end of the housing generally indicated at 50 is conveniently closed with a transparent plastic viewing window 52 held in place by a suitable threaded end closure 54 and desirably including some sealing means, for example, an O-ring 56 in a recess 58. Any clear plastic material, e.g., poly (methylmethacrylate) may be used for the viewing window 52 to enable reading of a digital readout light emitting diode element 60 diagrammatically indicated by the dotted line.

The electronic circuitry for detecting the alpha particle radiation contacts with the detector and converting them to a decimal readout as shown in FIG. 1 is conventional and is disposed within the tubular aluminum body 12 together with a plurality of small dry cells of the pen light type aggregating, for example, 4 to 6 volts, in a pack. Thus, the device is entirely self-contained and because it is not depending upon high resolution and unconcerned about noise factor, the detector unit 24 may be of a relatively inexpensive grade of semiconductor. Such semiconductors may be found to be below standards for such uses as spectroscopic analysis. However, for alpha particle counting purposes and in the condition under which the counting takes place in the present devices, these smaller area semiconductors may be used as effectively as the high priced, high quality semiconductors.

A suitable detector element is a partially depleted surface barrier detector, phosphorus-silicon. These detectors are sensitive to visible light and accordingly, the window must be opaque to visible light. The area necessary for the present detectors is considerably less than required for current devices. Thus, devices in accordance herewith utilize detectors having an area of 100 mm$^2$ or less as compared with 400 mm$^2$ for commercially available radon-222 detectors. The detectors hereof have a depletion depth of from a few to 1000$\mu$ although depletion depths of no more than a few are required. They are conveniently coated with gold to the extent of 40$\mu$ grams/cm$^2$.

Because of the environment in which these alpha particle detectors are utilized in accordance herewith, low operating voltage of the order of 4 to 5 volts and without a bias voltage on the semiconductor and the attendant circuitry and power source necessary therefor, may be used effectively to provide accurate representation of radon-222 generated alpha particles. The pre-amplifier of FIG. 1 is preferably designed with high gain to enhance the responsiveness of the detector to lower energy alpha particles. The pre-amplifier should also have a high input impedence to prevent loading of the detector.

Figure 3:
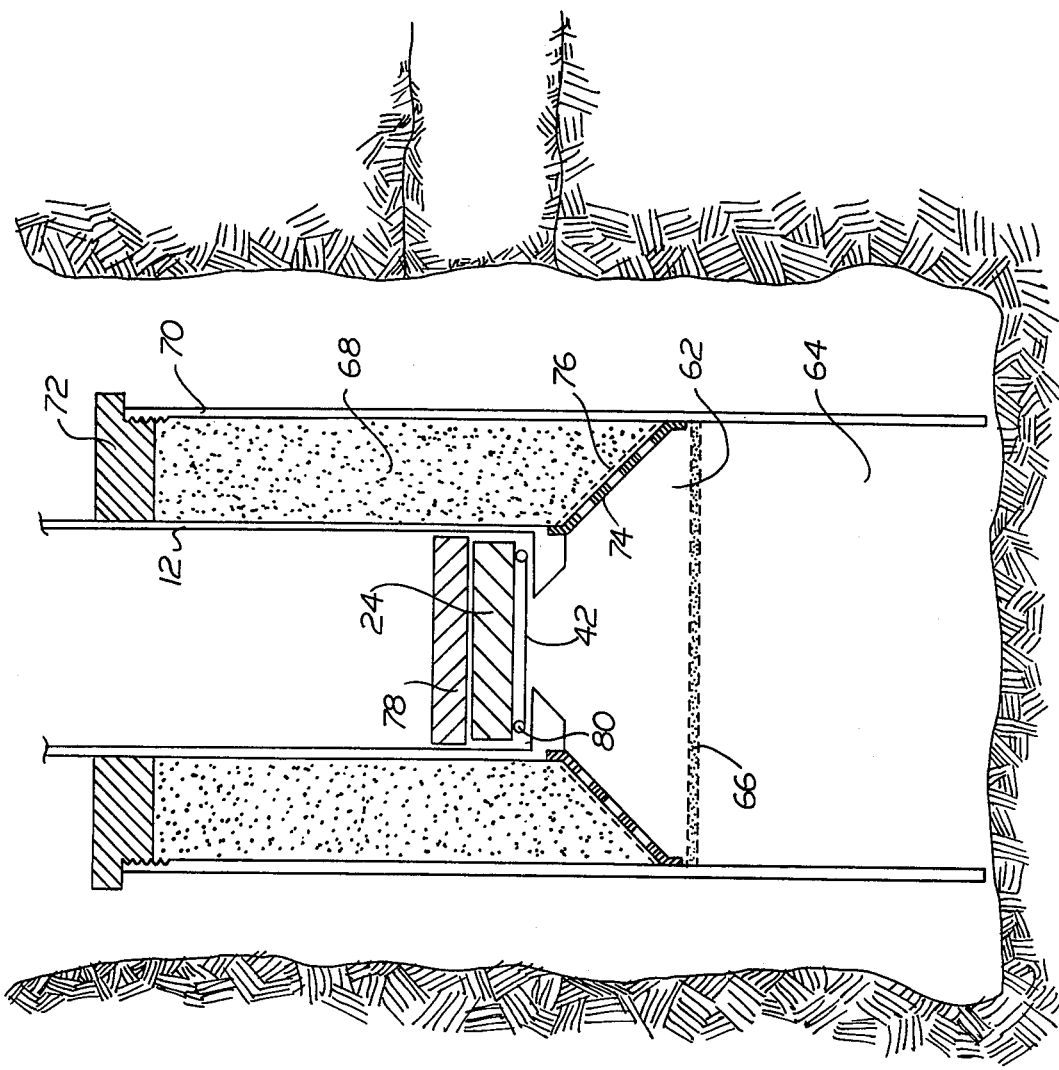
FIG. 3 is a diagrammatic representation of a modification of a radon-222 alpha counter in accordance with the present invention and including gas filter means permeable to radon-222 gas.

FIG. 3 shows another embodiment of the present invention which avoids interference by water vapor condensation in the course of alpha particle measurements. The principle of the embodiment shown in FIG. 3 is to restrict the exchange of gas between an analysis volume 62 and an ambient air volume 64 by interposition of a flow restrictor 66. This is done so that gas between both volumes 62 and 64 is exchanged sufficiently fast, say once in 5 hours for radon-222, to avoid a significant reduction of activity in the radioactive gas in the analysis volume 62, but slowly enough to avoid, within a period in the order of 1 month, saturation of a desiccant 68 contained in an annular space between an outer shell 70 and the surface of the body 12 of a device such as shown in FIG. 3. In this embodiment, the desiccant may be in a granular form but is confined between the tubular members 12 and 70, the sealing disc 72 and a perforated frustoconical member 74 having a diffusion member 76 supported therebehind and held in position against the diffusion plate 74 by the trapped desiccant 68. In the embodiment, the desiccant abstracts moisture from the analysis volume 21 so that moisture is prevented from entering the space between the window 42 and the detector 24.

When the apparatus shown in FIG. 3 is embedded in the soil to a depth of about 0.75 to 2 feet, a temperature difference of no more than a few degrees centigrade is anticipated between the apparatus and the surrounding soil. Therefore, a moderate reduction in the relative humidity in the analysis volume 62 to say, for example, 60% relative humidity, is sufficient to avoid condensation on the window 42 in front of the detector 24. The drying rate of the gas in the analysis volume 62 can be adjusted by means of the flow restrictor 76. Rise of water inside the outer tube 70 can be avoided by sealing the window 42 to the inner tube 12 and providing a sealing disc 72 between the inner tube 12 and the outer tube 70. The flow restrictors 66 and 76 can be in the form of a microporous screen or filter wherein the pores are of the order of 0.2 to 20 microns in diameter. In the embodiment shown in FIG. 3, a plate 78 may be used to compress an O-ring 80 to effect a seal.

The modification described above depends primarily upon gas diffusion through a flow restrictor screen 66. Flow to the analysis volume 62 can also be generated by a pump or an evacuated volume which is connected to the analysis volume by very high gas flow impedance, e.g., a fine pore (0.2-15 micron) diffusion plate.

As shown in FIG. 3, the device is adapted to be inserted in a shallow hole in the test area which may be exposed to runoff of surface water in the course of a survey. Prevention of actual wetting by liquid water of the detector 24 and removal of excess moisture in the test volume 62 is accomplished in the structure shown.

Figure 4:
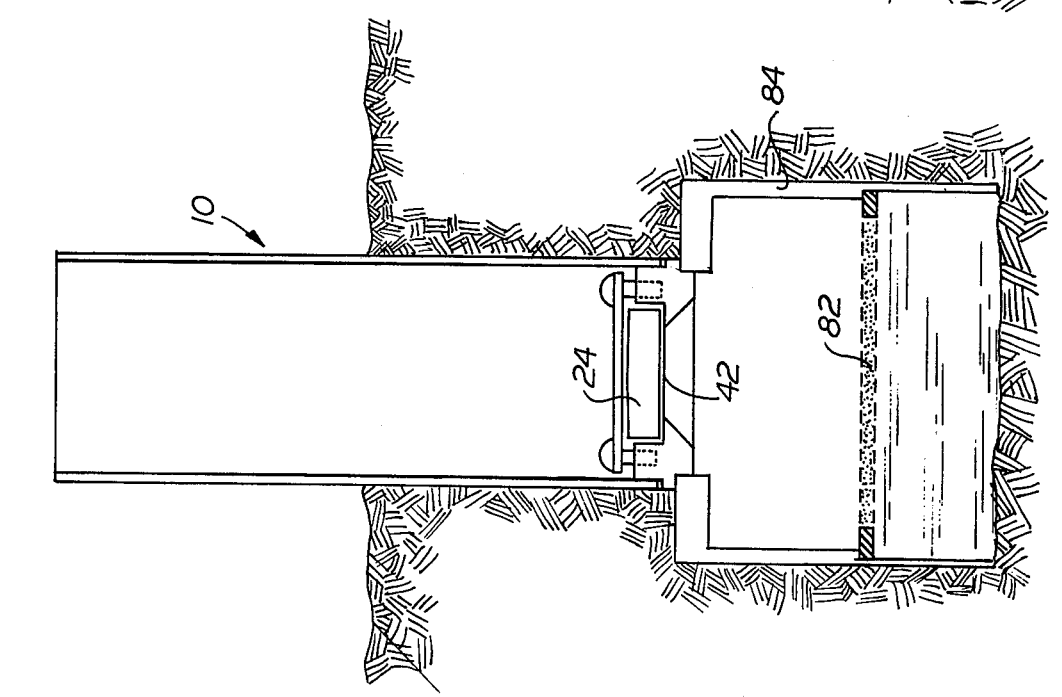
FIG. 4 is another diagrammatic representation of a modification of a device in accordance with the present invention showing its application below ground level but near the surface and including a filter permeable to radon-222 gas but impermeable to water.

FIG. 4 shows another embodiment of the present invention which allows gas flow through an alpha particle permeable filter 82 and contact of the alpha particles with the detector 24 through the window 42. The detector assembly is diagrammatically represented and is that which is shown in FIG. 2. A shield 84 is provided and supports at a distance from the detector 24 the filter 82. The filter 82 has a porosity which is sufficient to pass gases which may include radon-222, but insufficient at the depth of which it is used to permit water to pass through the membrane 82. The membrane 82 may be formed of any non-wetting material such as Teflon, having a thickness of from 0.5 mil to 5 mils, or at least a non-wetting coating such a paraffin wax. The dimensions of the required pore openings depend largely on the maximum water pressure across the filter element 82. For example, a 0.2 micron pore size membrane will hold back 35 pounds per square inch of water or approximately 80 feet of waterhead before it starts to flow. A Teflon membrane with 15 micron diameter pores will hold back a column of water about 1 foot high. This is sufficient for many applications.

Figure 5:
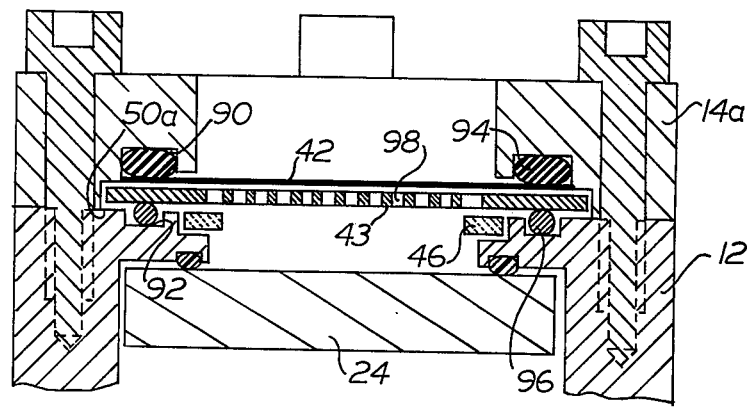
FIG. 5 is another modification in accordance with the present invention and showing a perforated support for a window in accordance with the present invention.

FIG. 5 shows another modification of the alpha particle counter of the present invention utilizing a perforated plate to support the window 42. This structure is essentially the same as that shown in FIG. 1 with the exception that the perforated support plate 43 is interposed behind and in supporting relation with the window 42. The end closure 14a is modified slightly as is the end 50a of the tube or housing 12. These modifications comprise the provision of recesses 90 and 92 in the closure 14a and the end surface 52a, respectively. The perforated disc 43 may be formed of any suitable metal, e.g., stainless steel, and contains a plurality of openings 98 and is in direct contact with the window 42. The myriad openings may be from 0.001 to 0.5 inch in diameter. The shaped desiccant 46 is shown in position between the window 42 and the detector 24. The thin foil window 42 will withstand much higher pressure differentials when the foil is forced toward the support plate 43 than when the thin foil window 42 is otherwise unsupported. The holes 98 are conveniently 0.04 inch in diameter. A thin Mylar disc with a thickness in the order of 0.1 to 0.5 mil, coated on one or both sides with aluminum and impermeable to visible light, but permeable to alpha particle radiation, can withstand several atmospheres of pressure when stretched across holes of the diameter of holes 98, e.g., 0.04 inch. The device shown in FIG. 5 using the pressure withstanding window 42 is a design approach for nuclear detector protection. This type of design is suitable for instrument sensing alpha, beta, or gamma rays. It is a solid-state detector and the desiccant ring 46 insures low humidity in front of the detector 24. Desiccant ring 46 is formed of a desiccant such as silica gel or suitable molecular sieves.

The devices of the present invention are preferably sealed to water. They may be selectively rendered operative by externally operated magnetic switch means responsive to a magnet so that operation under field conditions can readily be initiated without breaking the water seal.

What is claimed is:

1. In a radon-222 alpha particle counter for detection of radon gas concentrations near the ground surface, including an elongated tubular housing, a semiconductor detector, and circuitry for counting alpha particle impulses, said detector being exposed to a gaseous medium permeable to alpha particles, the improvement which comprises means for attenuating moisture from said gaseous medium.

2. A radon-222 alpha particle counter for detection of radon gas concentrations near the ground surface including an elongated tubular housing, an alpha particle permeable, visible light impermeable window, a semiconductor detector in spaced relation to said window, and a confined alpha particle permeable gas medium between said window and said detector, circuitry for counting alpha particle impulses, and means for attenuating moisture from said gaseous medium.

3. A radon-222 alpha particle counter in accordance with claim 2 wherein said moisture attenuating means is a shaped desiccant.

4. A radon-222 alpha particle counter in accordance with claim 3 in which the shaped desiccant contains silica gel.

5. A radon-222 alpha particle counter in accordance with claim 3 in which the shaped desiccant contains molecular sieves.

6. A radon-222 alpha particle counter in accordance with claim 1 in which the semiconductor detector is a surface barrier semiconductor.

7. A radon-222 alpha particle counter in accordance with claim 6 in which the semiconductor detector is a phosphorus/silicon partially depleted surface barrier semiconductor.

8. A radon-222 alpha particle counter in accordance with claim 2 in which the semiconductor is an unbiased surface barrier semiconductor.

9. A radon-222 alpha particle counter in accordance with claim 2 wherein said membrane is supported on a perforated support having myriad holes therethrough of from 0.001 to 0.005 inches diameter.

10. An alpha particle detection apparatus having an alpha particle path including an alpha particle permeable, light impermeable membrane, a water-tight gas filled space less than one inch wide, and a surface barrier semiconductor, and means for attenuating moisture from said gas filled space.

11. A detection apparatus in accordance with claim 10 wherein the membrane is an aluminum coated thin plastic sheet having a thickness of from 0.1 to 1 mil.

12. A detection apparatus in accordance with claim 11 in which the plastic sheet is poly (ethylene terephthalate).

13. A detection apparatus in accordance with claim 11 wherein the means for attenuating moisture is a shaped desiccant.

14. A detection apparatus in accordance with claim 13 wherein the shaped desiccant is in the form of an annulus.

15. A detection apparatus in accordance with claim 14 wherein the desiccant is anhydrous phosphorus pentoxide.

16. A detection apparatus in accordance with claim 10 additionally including in the alpha particle path gas filter means ahead of the membrane.

17. A detection apparatus in accordance with claim 16 wherein the gas filter means is a porous disc having pores of from 0.2 to 15 microns in size.

18. A detection apparatus in accordance with claim 17 wherein the gas filter means is formed of poly (tetrafluoroethylene).

19. An alpha particle detection apparatus including an elongated tubular housing having an alpha particle entry and detection end, and solid state circuitry means contained in said housing for counting alpha particle impulses and converting them to a count representing signal, and count signal transmitting end, an annular closure ring at said alpha particle entry end in sealing engagement with said housing, an alpha particle permeable, visible light impermeable membrane across the end of said housing and retained thereon by said closure ring, an inwardly directed abutment in said tubular housing having an opening therethrough for passage of alpha particles, a surface barrier semiconductor detector secured against said abutment and spaced inwardly from said membrane and defining with said membrane, said housing and said closure a gas filled cavity permeable to alpha particles, and means including a shaped desiccant disposed in said cavity for attenuating moisture from said gas.

20. A detection apparatus in accordance with claim 19 further including a perforated membrane support disposed between said membrane and said detector for supporting said membrane against inwardly directed fluid pressure.

21. In combination in a nuclear particle counting device including an elongated tubular body closed at one end and having a thin nuclear particle permeable membrane at the other end thereof, a rigid perforated plate for supporting said membrane being in surface-to-surface contact with said membrane and having myriad holes therethrough of from 0.001 to 0.5 inch diameter, means for supporting said perforated plate in said one end of said device on the downstream side of said membrane opposite the side of said membrane exposed to pressure, said membrane and said perforated plate coacting to close said other end of said body, means carried in said body for detecting nuclear particles which permeate said membrane and said perforated plate, and means for counting said detected particles.

* * * * *

UNITED STATES PATENT AND TRADEMARK OFFICE
CERTIFICATE OF CORRECTION

PATENT NO. : 4,104,523

DATED : August 1, 1978

INVENTOR(S) : Ludwig G. Wolfert

It is certified that error appears in the above-identified patent and that said Letters Patent are hereby corrected as shown below:

Column 8, line 23, change "0.005" to --0.5--.

Signed and Sealed this

Eighth Day of May 1979

[SEAL]

Attest:

RUTH C. MASON  
Attesting Officer

DONALD W. BANNER  
Commissioner of Patents and Trademarks